A. J. WILLIAMS.
OIL CONTROL TRANSMISSION.
APPLICATION FILED FEB. 19, 1917.

1,269,029.

Patented June 11, 1918.
2 SHEETS—SHEET 1.

INVENTOR
Alva J. Williams
BY
Fred P. Gorin
ATTORNEY

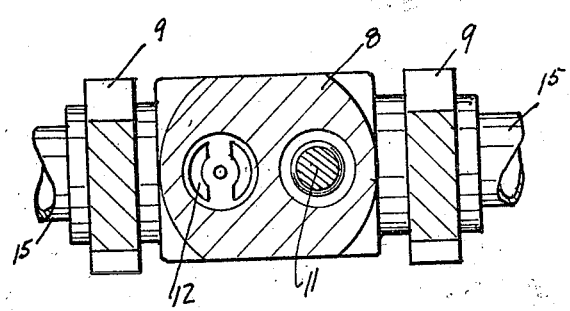
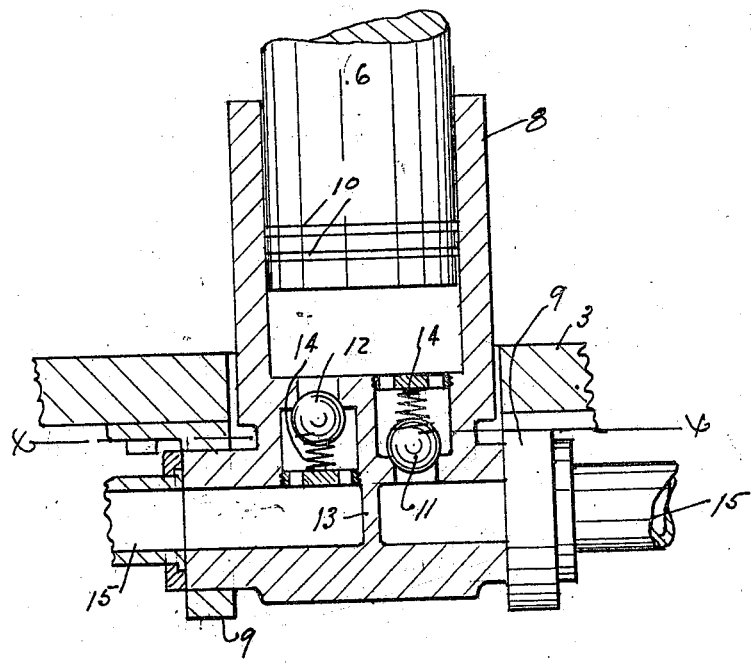

UNITED STATES PATENT OFFICE.

ALVA J. WILLIAMS, OF SEATTLE, WASHINGTON, ASSIGNOR TO WILLIAMS OIL CONTROL TRANSMISSION COMPANY, OF PIERCE COUNTY, WASHINGTON.

OIL-CONTROL TRANSMISSION.

1,269,029.

Specification of Letters Patent. Patented June 11, 1918.

Application filed February 19, 1917. Serial No. 149,647.

*To all whom it may concern:*

Be it known that I, ALVA J. WILLIAMS, a citizen of the United States, residing at Seattle, in the county of King and State of Washington, have invented certain new and useful Improvements in Oil-Control Transmissions, of which the following is a specification.

My invention relates to oil control transmissions and has for its principal object to provide an improved and novel type of oil control transmission for motor vehicles and the like; to provide transmission in which the throttling of oil transmission is employed to positively connect a driving and driven element; to provide an improved and novel construction for connecting a driving and a driven element in an oil control transmission. In automobile transmission it is desirable to improve upon the present shifting of gears in order to vary the speed and power of the machine, and further to avoid the usual jolts to the changing gears. My device is designed to provide a smooth operating and variable transmission in which any number of different speed and power combinations may be used.

Other objects will appear as my invention is more fully explained in the following specification, illustrated in the accompanying drawing and pointed out in the appended claims.

Figure 1:
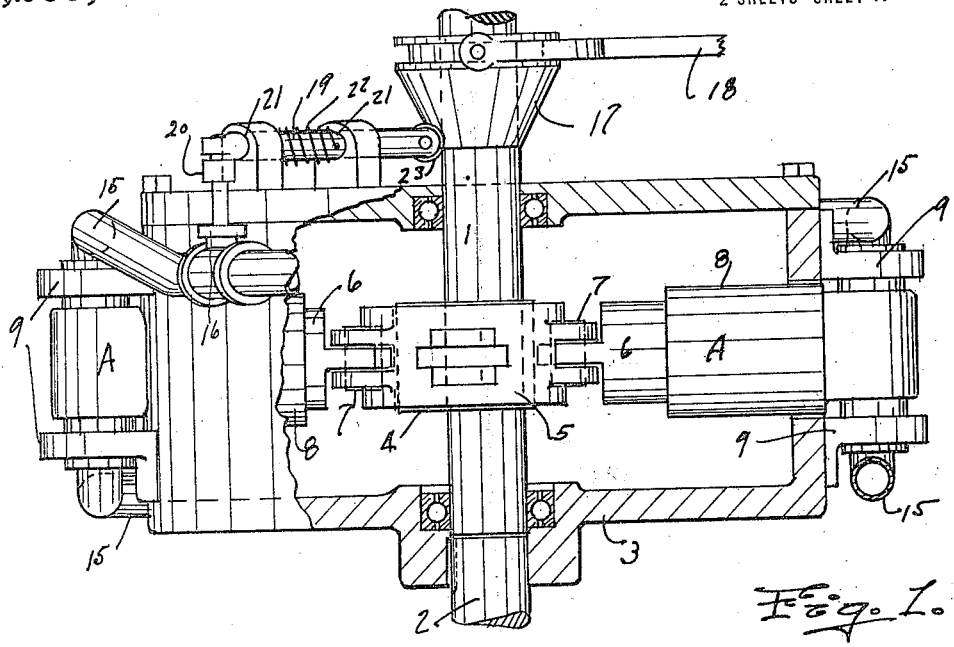
Figure 2:
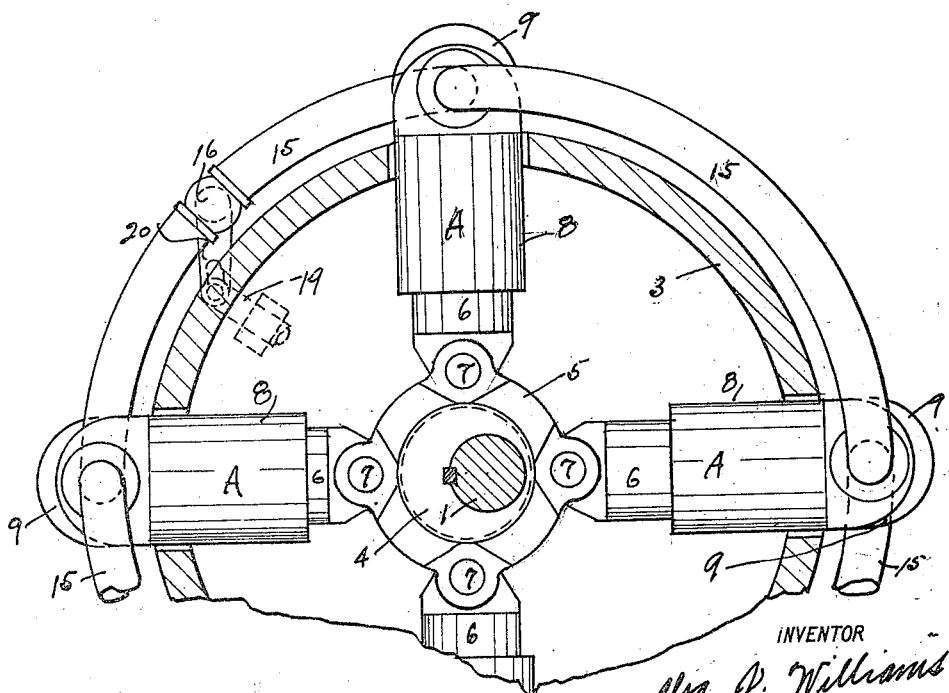

In the drawings Figure 1 is a plan view of my device with parts broken away. Fig. 2 is a sectional end elevation of same with parts broken away. Fig. 3 is an enlarged central cross section of one of the oil pumps of my device. Fig. 4 is a plan view of same taken along line *x—x* of Fig. 3.

Referring more particularly to the drawings, numeral 1 indicates a driving shaft and numeral 2 a driven shaft both of which have their axis in the same common line and their ends adjacent. A housing 3 is positively secured to the shaft 2 and also provides bearings for shaft 1. A series of oil pumps A are mounted radially in casing 3. The pumps A will be more fully described in detail later. It will be understood that there may be one set of pumps all of which lie in the same diametrical plane as shown in this case or there may be several series of such pumps, each series being arranged in its own plane. For each series of pumps there is an eccentric 4 secured to shaft 1 and an eccentric strap 5 which is revolubly mounted upon the said eccentric and which is connected to plunger 6 of each pump A by means of a pin 7. All of the pumps A are similar in construction and operation and include an outer cylinder 8 which passes through an opening in casing 3 and is trunnioned in bearings 9 which are secured to the outside of said casing. The plungers 6 previously referred to are slidably mounted within cylinder 8 and are provided with the usual piston rings 10 which maintain the plungers 6 in oil tight relation to the cylinder. It will be noted that the plungers 6 are moved in the cylinders 8 by means of and are connected to the eccentric ring 5. Each cylinder is provided with two valves at its outer end. Both of these valves are ball valves and will be designated as intake valves 11 and outlet valves 12. Valves 11 and 12 are similar except that they are reversed. The passages leading to valves 11 and 12 pass centrally through the trunnioned portion of cylinders 8 and are separated by means of a partition 13. Valves 11 and 12 are normally kept closed by means of springs 14. All of the cylinders are connected in a continuous chain by means of pipes 15 each of which connects an outlet valve passage on one cylinder to the inlet valve passage on the adjacent cylinder in the direction of rotation of the shaft 1. This form of connection enables the oil to flow continuously from cylinder to cylinder provided all the pipes 15 are unobstructed. One or more of the pipes 15 is provided with a valve 16 which is utilized to regulate the flow of oil between the various cylinders thereby limiting the quantity of oil which is pumped from cylinder to cylinder. It will be understood that when the valve 16 is completely closed that all flow of oil is stopped and the cylinders are therefore all securely locked in a fixed position as the entire system of cylinders and pipes is completely filled with oil at all times. In operation when one of the plungers 6 is drawn away from the valves oil flows into the cylinders past the valve 11 and when the plungers 6 move toward the valves on the return stroke the impounded oil is forced out past the valve 12. The taking in of oil is successively carried on from one cylinder to the next as the eccentric 4 moves the various plungers. When the valve 16 is open the driven shaft 2 is not set in motion by the drive shaft 1 and when the valve 16 is entirely closed both the shafts 1 and 2 rotate in unison. It will be apparent that when the valve 16 is partially closed there will be some slip between the shafts 1 and 2 or in other words, the shaft 2 will only revolve partially as rapidly as the drive shaft 1. It is therefore apparent wherein my device constitutes a transmission with many speed ratios. I provide means for opening and closing the valve 16 from the shaft 1. Said means includes a sliding tapered sleeve 17 mounted upon shaft 1 and operated by means of a fork lever 18. A valve rod 19 is pivotally connected to the valve handle 20 and is slidably mounted in bearings 21 which are a part of casing 3. A spring 22 normally holds the valve handle in a predetermined position and also holds a roller 23 on the lower end of stem 19 in engagement with the tapered sleeve 17. When it is necessary to change the position of the valve 16 it is only necessary to slide the sleeve 17 toward the casing 3 in order to raise the rod 19 thereby operating the valve handle 20.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

1. In an oil control transmission, the combination of a drive shaft, a driven shaft, a casing secured to the driven shaft and revolubly mounted upon the drive shaft, a plurality of plunger oil pumping means passing radially through and trunnioned externally to said casing, and an eccentric mounted upon the drive shaft, an eccentric strap revolubly mounted upon said eccentric and pivotally connected to each of the said plungers, an endless pipe system connecting all of said pumping means said pipe system including alternate individual pipes joining two adjacent pumping means on one side through the trunnions thereof, the pipe system being filled with an operating fluid, and means for regulating the flow of operating fluid in said pipe, said means including a sliding tapered sleeve mounted upon the drive shaft, a valve in said pipe system, a valve rod slidably mounted externally said casing and connected at one end to the handle of the said valve and coöperating with the said sleeve, whereby the valve may be closed or opened by moving said sleeve.

2. In an oil control transmission the combination of a drive shaft, a driven shaft, a casing secured to the driven shaft and revolubly mounted upon the drive shaft, radial openings in the said casing, a plurality of plunger oil pumping means, each of said pumping means including a cylinder which passes through one of the said openings in the casing and which is trunnioned at its outer end and externally to the said casing, a plunger slidably mounted within the said cylinder, an inlet valve in the outer end of the said cylinder, a similar outlet valve similarly located, pipes external the said casing and connected at one end through the trunnion of the cylinder with the outlet passage of one cylinder and with the inlet passage of the adjacent cylinder, whereby an operating fluid is admitted to the cylinder through one of the pipes and discharged to the adjacent cylinder through the other pipe thus forming an endless pipe system between the said cylinders, and a valve in the said system, whereby the flow of oil through the system is controlled.

In testimony whereof I affix my signature in the presence of two witnesses.

ALVA J. WILLIAMS.

Witnesses:
THERESE POORE,
NELL MORRISON.